(12) United States Patent
Carrel et al.

(10) Patent No.: US 8,489,245 B2
(45) Date of Patent: Jul. 16, 2013

(54) COORDINATED ENERGY RESOURCE GENERATION

(76) Inventors: David Carrel, Tiburon, CA (US); Leslie Weise, Boulder, CO (US)

( * ) Notice: Subject to any disclaimer, the term of this patent is extended or adjusted under 35 U.S.C. 154(b) by 241 days.

(21) Appl. No.: 12/701,390

(22) Filed: Feb. 5, 2010

(65) Prior Publication Data

US 2010/0211443 A1 Aug. 19, 2010

Related U.S. Application Data

(60) Provisional application No. 61/150,590, filed on Feb. 6, 2009.

(51) Int. Cl.
*G05D 3/12* (2006.01)
*G06Q 30/00* (2012.01)
*G06Q 40/00* (2012.01)
*G01R 11/56* (2006.01)

(52) U.S. Cl.
USPC ........ 700/286; 700/291; 700/295; 705/14.11; 705/37; 705/412

(58) Field of Classification Search
USPC ........ 700/22, 286, 291, 295, 296; 705/14.11, 705/37, 412
See application file for complete search history.

(56) References Cited

U.S. PATENT DOCUMENTS

| | | | |
|---|---|---|---|
| 6,263,260 B1 * | 7/2001 | Bodmer et al. | 700/275 |
| 7,171,374 B1 * | 1/2007 | Sheehan et al. | 705/7.25 |
| 7,542,824 B2 * | 6/2009 | Miki et al. | 700/291 |
| 2003/0144864 A1 * | 7/2003 | Mazzarella | 705/1 |
| 2005/0125243 A1 * | 6/2005 | Villalobos | 705/1 |
| 2008/0052145 A1 * | 2/2008 | Kaplan et al. | 705/8 |
| 2008/0167756 A1 * | 7/2008 | Golden et al. | 700/297 |
| 2008/0229226 A1 * | 9/2008 | Rowbottom et al. | 715/771 |

* cited by examiner

*Primary Examiner* — Sean Shechtman
(74) *Attorney, Agent, or Firm* — Patterson & Sheridan, LLP

(57) ABSTRACT

Demand response to reduce energy consumption by individual consumers is provided by aggregating individual consumers, and providing feedback to such consumers regarding their energy consumption relative to other energy consumers in a group. The resulting feedback may result in reduced energy consumption by the individual consumer.

16 Claims, 1 Drawing Sheet

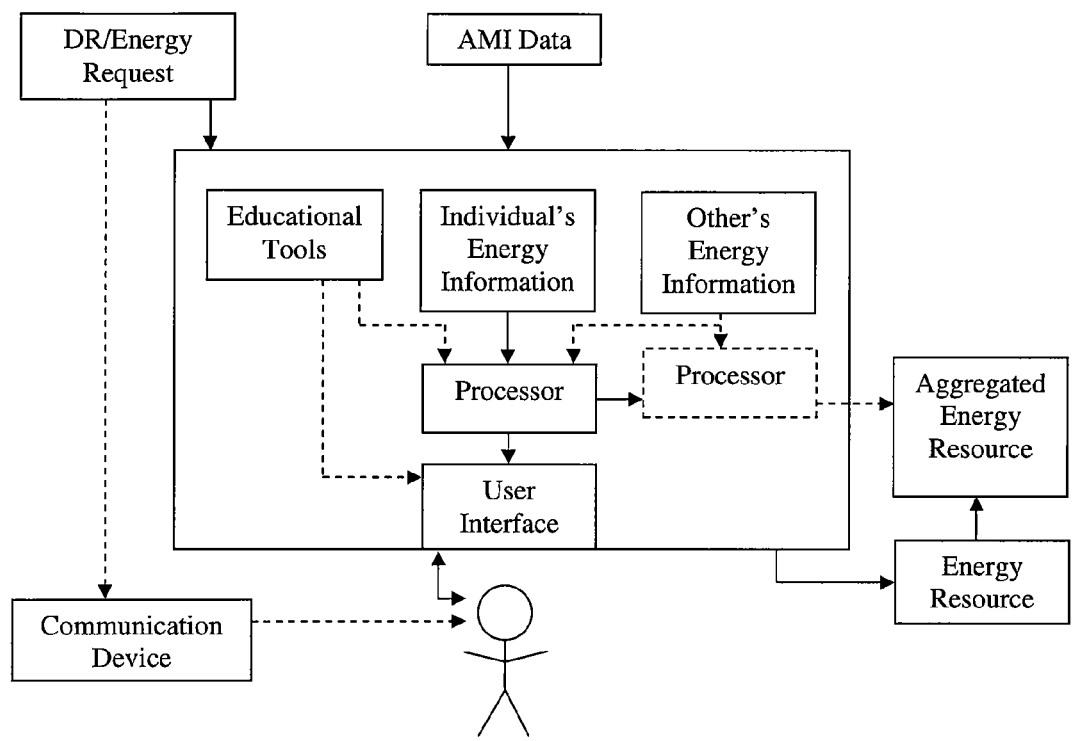

COORDINATED ENERGY RESOURCE GENERATION

CROSS-REFERENCE TO RELATED APPLICATIONS

This application claims benefit of U.S. provisional patent application Ser. No. 61/150,590, filed Feb. 6, 2009, which is herein incorporated by reference.

DESCRIPTION

Background of the Invention

The invention relates to the fields of energy conservation and efficiency, and energy management. These fields come together when energy reduction can be used to manage the demands for energy consumption. Demand response is the specific use of controlled reductions in normal energy consumptions, through energy conservation, efficiency, or energy use shifting to meet certain demands or reduce the costs for energy capacity. Demand response can be considered a resource in the same way that energy generation is a resource, in that demand response can offset significant costs and issues that energy generation presents. Both of these energy resources accomplish the goal of ensuring that the total energy demand at a given point in time can be met. Demand response may be particularly useful during peak periods of energy consumption, and can facilitate the energy generation, transmission and distribution issues inherent during moderate to high penetration periods of renewable energy generation by non-traditional and variable energy sources such as wind and solar. However, controlling energy reductions in a reliable way is difficult to accomplish in a large enough scale to make the demand response resource a lasting, reliable valuable resource.

The standard approach to generating demand response by utility companies or demand response aggregators is to automate the process; installing controls on machinery, lights, air conditioners and other energy consuming devices allows third parties to automate reductions in typically an industrial or commercial setting when there is a need for that energy resource. This automation approach is seen as a necessary means to overcome the inherent unreliability of demand response. Additionally, demand response is generated predominately by energy consumers with significantly large overall consumption. Smaller consumers are typically excluded from participation because they are not able to individually generate a significant demand response resource; technology and tools are not sufficiently developed so that it is cost effective to collect, exploit and monitor smaller consumers on a widespread basis. Automation has limitations with these consumers and often has negative effects as it can lead to feelings of loss of control and disenfranchisement. For residential and small business consumers, a need exists to effectively harness the potential of demand response, and in a manner that is different from automation.

SUMMARY OF THE INVENTION

The present invention seeks to build on the total potential demand response capacity by promoting and aggregating the demand response capabilities of the smaller energy consumers. Specifically it focuses on the residential and small business energy consumer, small-scale energy consumers, although it has application with small, medium and large energy consumers. Applicants' invention enables the consumer to have control over the generation of the demand response, and in response enables the creation of a marketable and valuable resource as a motivation and reward for their efforts and actions of energy efficiency, conservation and energy use shifting to times of the day when energy is more accessible or less expensive to generate by power providers. It empowers the consumer, educates them and gives them the tools with potential to create greater demand response benefit than automation can create. The present invention is a Communications Tool system (CT) that effectively uses communications, educational, computer processing, and behavioral science techniques to enable a valuable energy resource to be created through the collective actions by individuals of energy management that they take as a result of use of the CT.

BRIEF DESCRIPTION OF THE DRAWING

FIG. 1 is a schematic of the Communications Tool system for generating energy resources.

DETAILED DESCRIPTION OF THE INVENTION

The core of the CT system and method described herein is a communications framework that provides real-time two-way communications with the consumers. This framework brings together the requests for demand response, real-time and long-term analysis of the consumers' actual energy consumption and reductions, and analysis, education and advice on ways to increase the level of consumption reduction by an individual or group. Behavioral science techniques are used in the communications framework to maximize effectiveness. The novel approach presented by the CT is the unique combination of using targeted behavioral science and education with communications software and tools to produce demand response resources that have value to many entities, including a power provider, e.g. utility, cooperative, community choice aggregator, etc.; a consumer; a municipality or other government with mandates, laws or policies requiring actions related to energy consumption or greenhouse gas reduction; and society in general for the need to reduce fossil fuel based energy production and the associated social costs for related adverse health issues and pollution cleanup.

FIG. 1 shows the framework for the use and operation of the CT system. An individual user of the CT may receive a demand response request or other type of request regarding a need for energy from any number of entities, including a power provider, or local, state or federal agency. The types of energy request or signals for the need to conduct an act of energy management may include the desire to reduce peak demand usage, to shift energy use because of a relatively high or low penetration of renewable or other intermittent forms of energy on the transmission grid, or an energy emergency such as a brownout or severe weather situation. The communication may go directly to the individual, or pass through the CT and be forwarded as a communication to the user through the system. Advance Metering Infrastructure (AMI) or other real-time or historic energy information about an individual is entered into the CT and used to calculate energy use reductions from steps of energy management taken by that individual. The CT's processor uses that real time energy information of the individual and compares it with historical information by that same individual or another individual with similar energy use characteristics in order to calculate the energy use reduction that results from an act of energy management taken by that individual. A processor similarly compiles multiple energy use reductions from a user or group of users to calculate the energy resources that may be attributed to that person or group. A forum is provided for the users to market their generated energy resources, where they may exchange the energy resources for examples, for currency, for a credit to be used for reductions in their energy bill or other types of retail service or product transactions, or to be exchanged directly with partner wholesale or retail organizations for their respective services or goods.

The CT enables individual residential and small business consumers (small-scale energy consumers) and the groups they form or are aggregated by association (Community Groups) to have: a) the knowledge and motivation to conserve energy of various forms, particularly electricity, and b) the capability to market the electricity conserved or reduced in the form of demand response resources (DRR) or more generally, an energy resource. In turn, those entities responsible for selling power to people within defined regions will benefit from a reliable energy resource that emits zero greenhouse gas emissions, and which helps to offset the more costly new supplies of power which might require additional capital expenditures for more equipment, power plants and infrastructure to supply an ever increasing demand for electricity.

The CT provides new and enhanced forms of two-way communication from each small-scale energy consumer to their power provider such that benefits can be reliably attained by each. The CT takes advantage of the internet, associated networking and communication tools (web 2.0 applications and beyond such as Facebook, Twitter, etc.) and other communications means (email, phone, text messaging, etc.), to create a richer dialogue for the small-scale energy consumer. The CT is flexible and designed to take advantage of currently existing applications and means and those to become available in the future.

Demand response at the individual residential consumer level is difficult to predict and quantify as a measurable and reliable resource to power providers. While techniques are being implemented to tap DRR from large commercial energy consumers, DRR from individual small-scale energy consumers has not been exploited to nearly its potential due to the small size of prospective individual reductions, the absence of tools available to accurately monitor and control the reductions, and its reliability as a resource. Yet small-scale demand response has the potential to be a significant component of the total available demand response resource. Consequently, new techniques are needed to group small-scale energy consumers into a viable sized resource and to harness their demand response energy resources in a coordinated, reliable and lasting manner.

The invention represents the integration of the appropriate behavioral science data into a communications tool that will successfully create valuable DRR energy resources from individuals. Understanding and advancing the behavioral science is a key to meeting the challenge overcome by this invention. Environmental motivation has historically been erratic. Financial concerns over the price of energy have been a prime motivator for average consumers. However, energy cost fluctuations are often sporadic, e.g. the price of gasoline both exceeded $4.00/gallon and fell below $2.00/gallon in the same year of 2008, and are thus not reliable as a consistent tool for ongoing conservation. Environmental concerns have relative importance to people based on what other issues are affecting their lives at any given time. A recent survey conducted by the Pew Research Center illustrates this point precisely, showing that protecting the environment and global warming were the two of twenty social issues surveyed that dropped the most in priority over just a one year period in 2008 when the economy happened to suffer greatly personally affecting most Americans. To be successful, consistent communication channels directly to residential consumers must be motivational and must tie directly into a behavioral science approach that is focused on a mindset of permanent energy awareness and conservation. An analogy can be drawn with one's decision to get and stay in shape, requiring awareness, motivation and consistent efforts in order to create lasting behavioral changes. Behavioral science studies clearly demonstrate that consumers that are educated and aware are most engaged in an issue requiring change from one's own behavioral predisposition and thus are best suited for positive and lasting behavioral changes.

The CT furthers the use of behavioral science techniques mixed with modern communications methods. Group dynamics, including peer pressures, team dynamics, and group contagion techniques, mixed with energy and conservation information are tied into a communications infrastructure in a pioneering way that will enable the new learned behaviors to become a lasting part of individuals' lifestyles.

Applicant's CT utilizes technology as augmented by advanced behavioral science through mechanisms known to be successful at positively influencing individual behavior such as social communication, peer pressure and "culdesac-tivism" to generate a valuable and marketable product in the form of DRR from small-scale energy consumer energy conservation efforts. The aggregated energy resource created by use of the CT by groups of people or community groups is a valuable resource that will be beneficial to the power provider. Additionally, the benefit to the small-scale energy consumer can take various forms including energy cost reduction from decreased power consumption and DR compensation. DRR created through the CT can be exchanged for compensation individual consumer participants, payments to groups they are participating on behalf of (e.g. a school) or some other usable consumer resource such as certificates for green product discounts with participating retail vendors.

Community groups can be formed by a group of individual small-scale energy consumers for use of the CT, and may include neighborhood areas, geographical regions defined by governmental entities, associations such as churches, recreational clubs, schools, small businesses, etc. Larger communities seeking to promote energy conservation would also benefit. These include community choice aggregator groups CCAs which are forming across California and the country with goals of promoting greener power and energy cost reductions for their constituents, as well as county and state governments that have set long term energy reduction goals.

A primary role of the CT is to enable communication by and with individual consumers on several levels for various purposes. Individuals must be notified of different needs for demand response, e.g. conservation, energy use shift when a high penetration of wind or solar or other intermittent forms of energy is available, and for other needs such as regional carbon footprint reduction or energy emergencies. The invention builds a set of methods for communicating with each consumer based on preferences, time of day, priority and more. Communications are designed to alert and motivate consumers in carefully measured ways. Consumers may be communicated with by other group participants, power providers or whoever is operating the CT for purposes of building competitive spirit, to increase peer-pressure or any other motivational reasons that the applied behavioral science calls for.

The Advanced Metering Infrastructure (AMI) describes the use of smart meters which measure energy consumption and record Time of Day consumption data. Tome of Day data tells how much energy is consumed over any period of time during the day or night. AMI allows for energy rates based on periods of time with differing energy demands. It is also critical for enabling demand response measurements. In this invention it is also used for generating the data necessary to provide feedback to the consumer about theirs and others (peers) current and historical consumptions. The CT presents this consumption analysis to the consumers in a manner that is both informative and encouraging. It also uses the analysis to bring consumers together into groups such as "teams" for competitive or other motivational reasons to generate demand response resources.

Education is another feature of the Communications Tool, again useful for empowering the individual to take actions in furtherance of creating demand response resources. Educational information about energy use and consumption provides people with more knowledge leading to motivation to make changes in their individual energy management. Communications alert the consumers and the analysis informs them of what is happening. This educates them as to how their actions can create improvements and add to the DRR being created. The CT uses historical data, regional data, the consumer's load models and a database of energy saving methods to suggest future actions for the consumer to take to increase energy consumption reduction. After a suggestion is made, the CT will analyze the effects on consumption and will poll the consumer's opinions about the suggestion. This information will be used to help determine future suggestions.

Behavioral science improves the invention in terms of the way in which all aspects of the CT are presented to the consumer. It also determines the ways in which consumers are grouped together. Groupings have very strong effects on motivation, including peer pressure, team effects, community involvement and much more. The use of behavioral science is a key aspect of this invention. Since automated control of energy consuming devices is not used, the CT must be able to effectively motivate people to control their devices in both long term and short term ways.

This CT is unique in bringing all these components together to operate in a coordinated manner to address residential and small-sized consumer energy reduction. None of the prior art components to the CT addresses the creation of a valuable DRR that is marketable on a number of levels, including providing benefit to the consumer, the power provider, community groups and organizations, municipalities, and other entities in meeting energy, economic, and/or greenhouse gas reduction goals. The DRR can be exchanged for compensation or credits, which can be used for energy, retail or wholesale goods or services exchange. The CT can use real-time and historical usage data, energy provider load information, behavioral science techniques, group dynamics, modern communication and a forum for marketing the DRR created to create a complete tool for energy usage reduction. Real-time data is fundamentally important because it closes the feedback loop which allows the consumers to see their actual progress. Looking at historical analysis of that data of the individual users and others for comparison purposes also shows trends which also demonstrate progress and enables the measurement of the net energy reductions of the energy management efforts of the users. Additionally, the historical data can be shared (anonymously or not) amongst consumers with similar characteristics to create behavioral responses that benefit energy reduction efforts. This sharing of data is also key to the group dynamics of the system where the CT uses team effects and peer pressure to further motivate participants.

Information is presented to the consumer through a User Interface that has been designed around existing behavioral science techniques and will incorporate new techniques as they develop. The User Interface is the interface to all the underlying behavioral science. It is also the presentation tool for real-time and historical data and the management tool for the communications channels. Communications is the key to keeping the consumer connected to the other components. Communications are needed when energy company load information signals a reduction need or when behavioral analysis determines further communications are warranted.

Communications must be tailored to each consumer based on their personal preferences, lifestyle factors and energy use trends. Understanding the consumer's actual energy consuming habits including their use of energy consuming devices is a part of the CTs function. Consumers are asked to enter information about their personal habits and portfolio of appliances and other energy consuming devices. The level of detail can vary and can increase over time. Some information can be inferred when it is not available. A variety of energy consumer profiles and sub-profiles may be set and used by the CT for simplification.

The relevant areas of science and technology to features, which are advantageously enhanced by the CT, include the application of behavioral science to better understand how people react and how they can be positively and effectively motivated with educational tools and other information specific to energy use, conservation and management. Another area is the field of demand response aggregation into demand response resources (DRR), the efforts to date for which have been largely limited to commercial and industrial customers. The CT's processor uses comparison, calculation, compiling and analysis to determine the net energy reductions and data on energy resources generated by users of the CT. Another area is communications and internet technology, tools and infrastructure. The innovative CT ties these features to enable a valuable marketable energy resource.

The examination of behavioral science is not new, but a recent focus of study has been on how behavioral science relates to environmentalism. Several publications reviewed by Applicants relate to monitoring people's willingness to conserve energy or support environmental causes based on other social characteristics. Particularly relevant to the creation of the CT have been the studies relating to encouraging and motivating changes in behavior that enhance environmentalism and energy conservation causes. Some studies focus on individual effects, while others focus on group effects.

In the paper titled "*Green Defaults: Information presentation and pro-environmental Behavior*," published in the Journal of Environmental Psychology in 2007, the authors present their findings on the correlation between how information is presented to individuals and how that presentation affected their subsequent decisions. When making choices, if a default choice was offered, it was found to have a very strong effect on an individual's decision making process. Proper presentation was found to be a key factor in motivating people, as was demonstrated with specific energy conservation scenarios. Correspondingly, presentation is a fundamental aspect of the User Interface design for Applicants' CT system and process.

The 2008 publication titled "*A Room with a Viewpoint: Using Social Norms to Motivate environmental Conservation in Hotels*," from the Journal of Consumer Research explores several options that were presented to hotel guests to determine which most encouraged the guests' positive environmental choices are described. The study found that placing signs and literature in the room that merely requested and encouraged environmentalism, such as re-using towels, had moderate effects. Greater effects were achieved when the signs identified how other hotel guests were conserving. The greatest effects were achieved when the signs indicated specifically how other hotel guests in that same room had conserved. This study demonstrates the effects of peer pressure towards positive goals, and more specifically how group contagion with an explicit tie to the individual targeted for modified behavior could be a positive force for change. Further, in "*Social Norms: An Underestimated and Underemployed Lever for Managing Climate change*," a 2008 publication from the International Journal of Sustainability, it is shown that use of the identification of social norms (i.e. defining what "everyone else is doing") can be a very powerful tool for changing attitudes. Much of this papers' focus is on advertising and marketing, but can readily be applied to other forms of communications.

In "*Watershed Conservation and Preservation: Environmental Engagement as Helping Behavior*," published in 2008 in the Journal of Environmental Psychology, the motivation for people to become involved in watershed protection efforts was studied. It was found that the likelihood that people became involved in environmental issues began with an awareness of the issues. This then led to a sense of responsibility and then behavioral changes resulted. This study emphasized the importance of education used to create engagement and personal connection or "ownership" with environmental issues, leading to action. The authors consider the implications of these findings for interventions designed to increase environmental engagement.

Similarly, awareness was the key to fostering willingness to change as documented in a recent article concerning a trial being conducted by Oklahoma Gas & Electric and Silver Springs Networks, a developer of smart meters. The two companies installed 6,600 apartments in Oklahoma City with smart meters and thermostats that provided tenants with information about how much power they were consuming and how much that power was costing them. One of the goals of the trial was to see whether consumers would actually pay attention to price signals from the thermostat and act on it. The initial feedback and data seems to indicate to those conducting the study that it will have the desired effect. A sampling of some of the consumer comments regarding their participation in the program are as follows:

"I didn't know that peak usage was so much more expensive than other times."

"I didn't know that weekend rates cost less."

"The best thing is knowing you are saving and being able to calculate or see the amount you are using in a 24-hour period-being able to explain to the children why they were are not able to use the TV in every room."

"[I am] not keeping everything plugged in all the time. TVs, etc."

"Lights use a lot of electricity."

Using techniques including social norms, where proper (normal) behavior is defined, and group (peer) pressures, utilities have started to use programs that use behavioral science models to encourage energy conservation. Puget Sound Energy has started a pilot program where "Home Energy Reports" are being released monthly to 40,000 of its customers allowing each to compare their electricity and natural gas use with that of similar-sized homes in their neighborhoods. This excellent example of the effect of group contagion and peer pressure can be contrasted to past efforts where utilities have issued reports only showing individual usage, which even when combined with energy conservation advice, have fallen short of anticipated positive impacts. Puget Sound Energy is a client of Positive Energy, Inc., a company involved in compiling and presenting consumer usage data for motivational presentation to consumers. Similarly, a January 2009 New York Times article discusses the success achieved by utilities for including residents' comparative electricity consumption data with simple motivational smiley and frown faces in their monthly billing statements according to their usage rate relative to others in their neighborhoods. The Sacramento Municipal Utility District (SMUD) found that customers who received the personalized report reduced energy use by two percent more than those who received standard statements. Dr. Robert Cialdini, a social psychologist at Arizona State University, performed an experiment in 2004, leaving different messages on doorknobs in a middle-class San Diego neighborhood. Of all the messages used, including environmental pleas for future generations, and the potential for personal financial savings, the only kind of message to have any significant effect was the one that said neighbors had already taken steps to curb their energy use. The article quotes Dr. Cialdini who states, "It is very fundamental and primitive. The mere perception of the normal behavior of those around us is very powerful."

A common theme to the studies reviewed by Applicants and mentioned herein is the application of the latest science in motivational techniques as directly applied to environmentalism. While individual effects are important and must be considered, group effects have the greatest collective impact from the individuals involved and are intended to be a key part of our communications tool.

Of additional significant importance are the negative effects discussed in several of these studies. Certain measures taken that might have otherwise demonstrated positive effects fell short of their potential or failed completely if they were poorly implemented. Proper presentation and execution is a serious focus in the development and rollout of Applicants' CT.

Recently, internet-based tools are becoming available to address this area of behavioral science to effect positive changes related to personal energy conservation habits. For example, a Canadian partnership organization led by the Canadian Broadcasting Company (CBC) released a website called "One Million Acts of Green" which establishes the notion that one small act of reducing one's own carbon footprint made with environmental consciousness can make a big difference. This site promotes energy conservation by using group contagion, education and setting social norms and goals as motivational forces. As an educational and motivational tool, approximately 100 exemplary actions people can take which constitute an eligible "act" are listed, each with a background description of the problem concerning that action and a tally of GHG emissions saved by performance of the act. In the three months that this site has been active, the goal of reaching one million separate acts has almost been reached. Similarly, another website "One Day" promotes energy conservation by encouraging individuals to take one step each day. Exemplary "small" and "large steps" an individual can take are offered so that each person can choose what is right for them. The EnerQV Smackdown is a third website related to a "community outreach program to reduce carbon emissions" which presents a forum for people to enter into competitions with others in their towns for the purpose of creating a fun and motivational environment to engage neighbors to reduce energy consumption.

Utilities, regulators and customers see the benefits in making the customer connection more intelligent and responsive to system needs. According to the 2008 Federal Energy Regulatory Commission (FERC) Staff Report Assessment of Demand Response and Advance Metering, utilities have announced plans to deploy more than 40 million advanced metering infrastructure (AMI) meters in the next three years.

These meters are expected to replace the old electromechanical meters and previously installed AMR (automated meter reading) meters.

The FERC staff report found through survey results that the ratio of advanced meters to all installed meters (advanced metering penetration) in the U.S. had significantly increased from less than one percent in 2006 to 4.7 percent at the end of 2008. Increases in market penetration were found in all types of power provider organizations, including municipal utilities, investor-owned utilities, public utility districts, federal utilities, and cooperatives where the largest increase was found, i.e. advanced metering penetration from 3.8% to 16.4% during that same period.

As summarized in the Transmission and Distribution World online publication, the California Public Utilities Commission (CPUC) has approved AMI deployments for utilities throughout the state worth roughly US$3.5 billion, of which over the next five years utilities will upgrade their customer connection by installing nearly 16.5 million AMI meters. These trends favor the effectiveness of the CT in increasing the potential for DR contributions by small-scale energy consumers. Other features that are highly compatible with the CT that utilities are continuing to introduce and employ are time-of use rates programs such as Critical Peak Pricing, demand response features through programs such as Demand Bidding and Capacity Bidding Programs, and enhanced capabilities such as outage detection and assessment and remote connect/disconnect for electric customers.

In the area of demand response aggregation, the state of the art is seen in companies such as EnerNOC, Comverge, Echelon and others. These companies have taken a variety of different approaches, some very highly managed and some much less so. All of them have focused on commercial and industrial energy users, capitalizing on the much greater significant potential resource available from each large-scale energy customer and governed by tariffs. This large resource, often created through significant technological infrastructures, provides significant value; in the form of compensation to the aggregator companies and a decreased energy load and energy bill for these larger energy customers, and to the utility in the form of available demand response resources. However, this same resource remains untapped in the residential and small-scale demand response market where logistical hurdles remains and tariffs do not yet provide for them.

Automated control technology can be utilized to centrally control lights, copiers, air conditioners and much more. Companies such as Tendril Networks are developing commercial and residential control devices that incorporate communications from certain home or building appliances or other electricity consuming devices, e.g. air conditioners, to a utility to enable the utility to effect changes with those devices when it is advantageous for demand response or some other energy saving benefit. Xcel Energy's Smart Grid City$^M$ is attempting to instrument most household appliances and devices to produce smart homes that the utility can control. However, this is an expensive and complex way to effect energy conservation requiring extensive communications and software development. While this is presently the most viable residential demand response tool available, it presents other associated controversies. For example, central control of energy consumption by the utilities obviates the need for any real personal involvement by the resident whose home or small building is outfitted with the controls. A false sense of accomplishment by the resident, which might occur consciously or subconsciously, may be used to offset any gains in other areas of energy reduction or other personal consumption. In addition, many people distrust some other entity's control of their lifestyle choices including when and how to consume energy. It is Applicants' contention that addressing energy conservation without addressing behavioral science aspects is not fully sustainable and does not represent a complete solution to meeting demand response, electricity demand growth and environmental goals. Without sufficient education and awareness, people are susceptible to disengaging with the process, e.g. disregarding or turning off controls or available tools that they do not understand or believe in. On the other hand, significant results can be achieved through a non-automated approach which creates a requisite level of awareness and understanding regarding energy conservation habits, thus lessening the need for costly technological equipment and controls.

The CT's function of creating a reliable verifiable and measurable resource with small-scale demand response, will facilitate the ability to track and forecast them as a viable, marketable and valuable demand response resource. Further, the CT is a system for integrating demand response with energy efficiency, energy conservation, energy use shifting and smart grid programs along with other energy related education programs.

What is claimed is:

1. A system for generating an energy resource, comprising:
  a computing device for providing information to one or more individual users concerning energy use and one or more acts of energy management to determine one or more present and anticipated needs for conducting the one or more acts of energy management, wherein the acts of energy management are performed by the one or more individual users and reduce energy consumption;
  a two-way communication device for communicating with the one or more individual users concerning the one or more present and anticipated needs for conducting the one or more acts of energy management, wherein the one or more acts of energy management comprise acts performed by the one or more individual users in response to the communication with the one or more individual users, and wherein the communication with the one or more individual users comprises advice on ways to increase the level of consumption reduction by the one or more individual users;
  an information retrieval device for compiling and retrieving real time and historical information regarding at least one of the one or more acts of energy management and corresponding energy use reduction by the one or more individual users, and related energy use reduction of the one or more individual users;
  an analysis device to compare information retrieved regarding the one or more acts of energy management conducted by the one or more individual users concerning the communication of the one or more present and anticipated needs for conducting the one or more acts of energy management and corresponding energy use, with information regarding energy use by the one or more individual users, to establish a corresponding net reduction in energy use from the one or more acts of energy management conducted; and
  a compiling device for aggregating the one or more acts of energy management and their corresponding net reduction in energy use, wherein the information retrieval device, the analysis device, and the compiling device are provided by one or more processors, and wherein two or more of the aggregated acts of energy management generate an energy resource from the corresponding net reduction in energy use.

2. The system of claim 1, wherein the energy resource is generated by the one or more individual users.

3. The system of claim 1, wherein the one or more acts of energy management comprise energy conservation.

4. The system of claim 1, wherein the one or more acts of energy management comprise energy efficiency.

5. The system of claim 1, wherein the one or more acts of energy management comprise energy use shifting.

6. The system of claim 1, wherein the one or more individual users act on behalf of an organization that receives a benefit from the energy resources generated.

7. The system of claim 1, wherein the energy resource generated is exchanged for another item of value.

8. The system of claim 1, wherein the energy resource generated is exchanged for currency.

9. The system of claim 7, wherein the energy resource generated is exchanged for a credit.

10. The system of claim 7, wherein the energy resource generated is exchanged for a product or service.

11. The system of claim 1, further comprising a forum whereby the one or more individual users can market the energy resource generated.

12. The method of claim 1, wherein the communication with the one or more individual users further comprise using behavioral science techniques.

13. A method for generating an energy resource, comprising the steps of:
   providing education tools for providing one or more individual users with information concerning energy use and one or more acts of energy management, wherein the acts of energy management comprise acts performed by the one or more individual users in relation to a communication, and wherein the acts performed by the one or more individual users reduce energy consumption;
   communicating to the one or more individual users concerning a need for at least one present and anticipated source of the one or more acts of energy management, wherein the acts of energy management comprise acts performed by the one or more individual users in relation to the communication, wherein the communication with the one or more individual users comprises advice on ways to increase the level of consumption reduction by the one or more individual users;
   retrieving information regarding at least one of real time and historical information regarding the one or more acts of energy management and the energy use by the one or more individual users, and related energy use by the one or more individual users;
   comparing the retrieved information regarding at least one of real time and historical information regarding the one or more acts of energy management conducted and the energy use by the one or more individual users, with related information regarding energy use by the one or more individual users;
   establishing a corresponding net reduction in the energy use corresponding to the one or more acts of energy management conducted;
   compiling the one or more acts of energy management conducted to create one or more compiled acts of energy management; and
   generating one or more energy resources from the compiled acts of energy management and the corresponding net reduction in the energy use.

14. The method of claim 13, further comprising the step of:
   aggregating the one or more acts of energy management by groups of individual users to generate the energy resources.

15. The method of claim 13, further comprising the step of providing a forum for the one or more individual users to market the energy resources.

16. The method of claim 13, wherein the communication with the one or more individual users further comprise using behavioral science techniques.

\* \* \* \* \*